United States Patent
Sarin et al.

(10) Patent No.: US 8,832,780 B1
(45) Date of Patent: Sep. 9, 2014

(54) DATA LOSS PREVENTION OF A SHARED NETWORK FILE SYSTEM

(75) Inventors: Sumit Sarin, Pune (IN); Amit Shinde, Pune (IN)

(73) Assignee: Symantec Corporation, Mountain View, CA (US)

( * ) Notice: Subject to any disclaimer, the term of this patent is extended or adjusted under 35 U.S.C. 154(b) by 43 days.

(21) Appl. No.: 13/533,114

(22) Filed: Jun. 26, 2012

(51) Int. Cl.
*H04L 29/06* (2006.01)
(52) U.S. Cl.
USPC ............................................................ 726/1
(58) Field of Classification Search
None
See application file for complete search history.

(56) References Cited

U.S. PATENT DOCUMENTS

| 8,365,243 B1* | 1/2013 | Lu et al. ............................ 726/1 |
| 2010/0146269 A1* | 6/2010 | Baskaran ...................... 713/165 |
| 2012/0151551 A1* | 6/2012 | Readshaw et al. ................ 726/1 |

* cited by examiner

*Primary Examiner* — Brandon Hoffman
(74) *Attorney, Agent, or Firm* — Lowenstein Sandler LLP

(57) ABSTRACT

A data loss prevention (DLP) agent manages DLP polices of a shared network file system. The DLP agent identifies a request by an application to access a file from a shared storage device over a network, and enables monitoring on a local data store to detect file system requests by the application in response to the identifying. The DLP agent also analyzes data associated with the file to determine if the data violates a data loss prevention (DLP) policy, and enforces a response rule associated with the file if the data associated with the file violates the DLP policy.

14 Claims, 5 Drawing Sheets

DATA LOSS PREVENTION OF A SHARED NETWORK FILE SYSTEM

TECHNICAL FIELD

The embodiments of the disclosure relate generally to shared network files and, more specifically, relate to data loss prevention of a shared network file system.

BACKGROUND

A modern organization typically maintains a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, etc.

Organizations invest significant efforts in installing data loss prevention (DLP) components, especially on important machines where confidential data is getting generated, but they may not be able to protect each computer in the enterprise, due to reasons like large number of different platforms or operating systems (OS), machine outages, quick and dynamic provisioning of virtual machines, no clear and individual accounting for test and lab machines. DLP technologies apply configurable rules to identify objects, such as files, that contain sensitive data and should not be found outside of a particular enterprise or specific set of host computers or storage devices and should be accessible to certain users who are authorized for the purpose. Even when these technologies are deployed, it is possible for sensitive objects to 'leak'. Occasionally, leakage is deliberate and malicious, but often it is accidental too.

Organizations use shared servers as data repositories. Organizational policies enforce users to work from these shared servers to securely save their data. Oftentimes, the organization has rules in place to restrict users from copying confidential data from these shared servers on to their endpoint. The conventional DLP system prevents copying from network shares through application integration within a file explorer (e.g., Windows Explorer). However, this does not prevent a user from copying confidential data from these shared servers to a local machine using another application like a command prompt, or by opening a file from the shared server and performing a "save as" operation and saving the document to the local machine. Additionally, an application may read from one network-shared file and write to another file. Currently, there is no method for correlating the two file operations.

SUMMARY OF THE INVENTION

A data loss prevention (DLP) agent manages DLP polices of a shared network file system. The DLP agent performs a method to identify a request by an application to open a file from a shared storage device over a network, and enable monitoring on a local data store to detect file system requests by the application in response to the identifying. The method also analyzes the data associated with the file to determine if the data violates a data loss prevention (DLP) policy, and enforces a response rule associated with the file if the data of the file violates the DLP policy. The method, in one embodiment, detects that the application has closed the file and disabling monitoring on the local data store for the application.

In one embodiment, the method creates a profile of the file from the shared network device, wherein the profile comprises metadata corresponding to the file, allows write operations to a new file located to the local data store by the application, and detects when the application closes the new file from the local data store. The method also includes creating a profile of the new file, wherein the profile of the new file includes metadata corresponding to the file, and comparing the metadata of the file to the metadata of the shared network file.

In a further embodiment, the method comprises enforcing the response rule associated with the file if the metadata of the new file matches the metadata of the shared network file. The metadata comprises at least one of but not limited to filename, file size, file type, or fingerprint. The write operation comprises one of a file save event, a file close event, or a copy event. Enforcing can include one of blocking confidential data, re-routing confidential data, reporting the violation, quarantining the data, or encrypting the data.

In addition, a computer readable storage medium for a DLP agent is described. An exemplary computer readable storage medium provides instructions, which when executed on a processing system causes the processing system to perform a method such as the exemplary methods discussed above.

Further, systems and apparatus of certificate management sensor are described. An exemplary apparatus may include a memory and a processor coupled to the memory. The processor is configured to execute the DLP agent to perform various operations, such as those described above.

BRIEF DESCRIPTION OF THE DRAWINGS

Embodiments of the present disclosure are illustrated by way of example, and not by way of limitation, and can be more fully understood with reference to the following detailed description when considered in connection with the figures in which.

DETAILED DESCRIPTION

Figure 1:
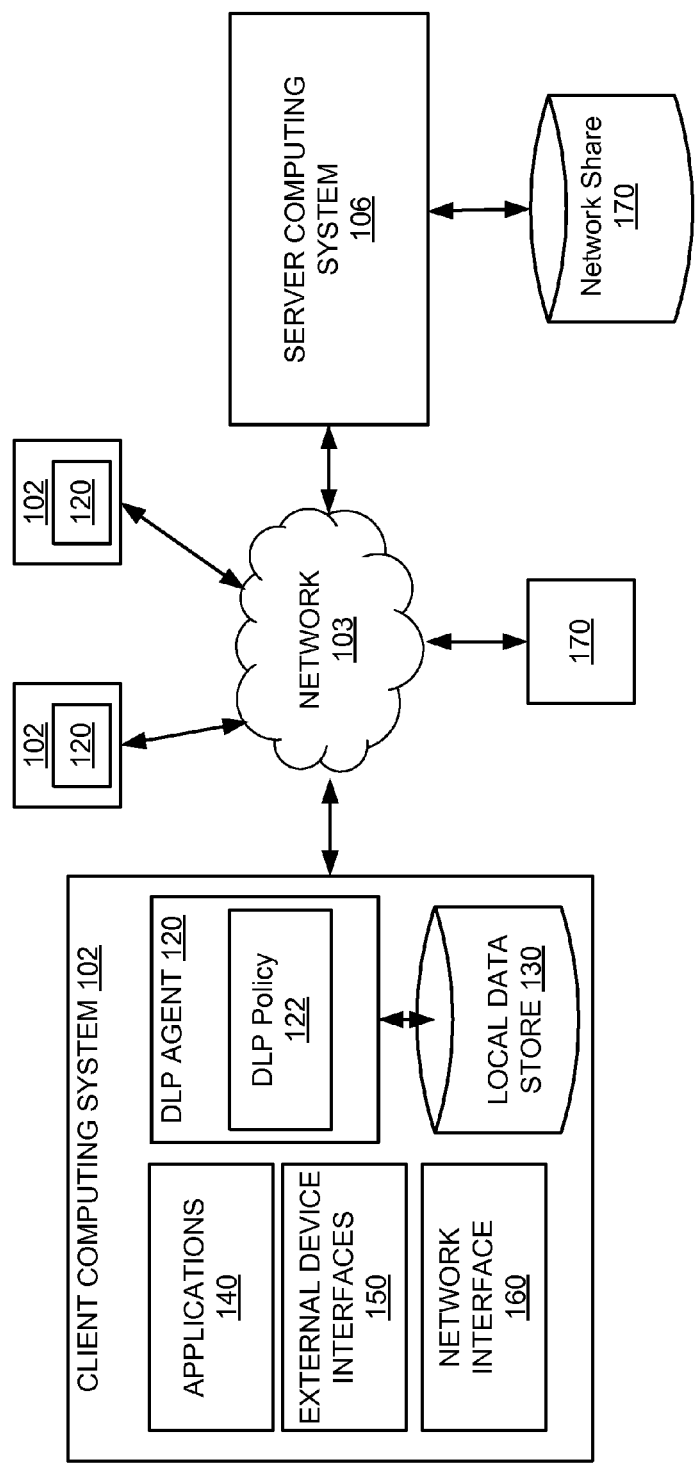
FIG. 1 is a block diagram of an exemplary network architecture in which embodiments of a DLP agent may operate.

Described herein are methods and systems for data loss prevention (DLP). Embodiments of the present disclosure provide a DLP agent that enforces DLP polices on network share file systems. The DLP agent identifies a request by an application to access a file from a shared storage device over a network, and enables monitoring on a local data store to detect file system requests by the application in response to the identifying. The DLP agent also analyzes data associated with the file to determine if the data violates a data loss prevention (DLP) policy, and enforces a response rule associated with the file if the data associated with the file violates the DLP policy.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

FIG. 1 is a block diagram of an exemplary network architecture 100 in which embodiments of a DLP agent 120 may operate. The network architecture 100 may include multiple client computing systems 102 and a server computing system 106 coupled via a network 103 (e.g., public network such as the Internet or private network such as a local area network (LAN)). Examples of a client computing system 102 may include, but are not limited to, personal computers, laptops, PDAs, mobile phones, network appliances, etc. The server computing system 106 may be a network appliance, a gateway, a personal computer, etc. The client computing systems 102 and the server computing system 106 may reside on the same LAN, or on different LANs that may be coupled together via the Internet, but separated by firewalls, routers, and/or other network devices. In another embodiment, the computing systems may reside on different networks.

The depicted client computing system 102, which may operate as an endpoint machine in an enterprise network, includes the DLP agent 120. The client computing system 102 may include applications 140, external device interfaces 150, and network interfaces 160 that can be monitored by the DLP agent 120 as would be appreciated by one of ordinary skill in the art having the benefit of this disclosure. Alternatively, the DLP agent 120 can monitor other aspects of the client computing system 102 to monitor inbound data transfers. The client computing system 102 may also include a local data store 130, which can be one or more centralized data repositories that store the violation information, DLP policy information, and the like. The local data store 130 may represent a single or multiple data structures (databases, repositories, files, etc.) residing on one or more mass storage devices, such as magnetic or optical storage based disks, tapes or hard drives. Although illustrated as being local to the client computing system 102, the local data store 130 may be remote from the client computing system 102 and the client computing system 102 can communicate with the local data store 130 over a public or private network.

The DLP agent 120 is configured to operate on the client computing system 102. Alternatively, the DLP agent 120 may be configured to operate on the server computing system 106 to remotely monitor the client computing system 102. Alternatively, some of the functionality of the DLP agent 120 is performed on the client computing system 102, while other functionality of the DLP agent 120 is performed on the server computing system 106. Also, the embodiments described herein may be used in other applications that can be used for performing DLP processing operations as would be appreciated by one of ordinary skill in the art having the benefit of this disclosure.

In one embodiment, the DLP agent 120 monitors inbound data transfers by the client computing system 102 from a network share 170. As part of monitoring and detecting violations, the DLP agent 120 may perform various methods of detecting violations of a DLP policy, such as content matching (e.g. regular expressions, keyword dictionaries); 2) fingerprinting; and 3) machine-learning based content classification. In addition, the DLP agent 120 may utilize a structure analyzer (not shown) to identify information that should be protected, but that are not specifically identified in the DLP policy or without a priori knowledge of the information. This allows the DLP agent 120 to protect information that has not been added to DLP policies yet or information that is not specifically identified as being protected by the DLP policies.

The DLP agent 120 is configured to detect a violation of a DLP policy in inbound data transfers. If the DLP agent 120 detects a violation, the DLP agent 120 may prevent the data transfer and may report the violation. For example, the DLP agent 120 may create an incident record of the violation, and may store the incident record, or may send the incident report to a DLP system manager, or the DLP agent 120 stores the incident report locally on the local data store 130.

The DLP agent 120 identifies, monitors, and protects data in use (e.g., endpoint actions), data in motion (e.g., network actions), and data at rest (e.g., data storage). Such data may be in the form of files, messages, web requests or the like. Typically, a DLP agent 120 monitors various files, messages, etc. to determine whether they constitute use-restricted documents or objects. A use-restricted document represents a document that cannot be freely distributed or manipulated due to its sensitive nature. Use-restricted documents may be marked with such words as "confidential," "sensitive," "stock," etc. to indicate their sensitive nature. In addition, use-restricted documents may include confidential information such as customer, employee or patient personal information, pricing data, design plans, source code, CAD drawings, financial reports, etc.

The DLP agent 120 may determine whether a file or a message is a use-restricted document by applying a DLP policy 122. A DLP policy 122 may specify what data should be present in a file or message to be classified as a use-restricted document. For example, a DLP policy 122 may specify one or more keywords (e.g., "confidential," "sensitive," "stock," names of specific diseases (e.g., "cancer," "HIV," etc.), etc.) for searching various files, messages and the like. DLP policies will be discussed in greater detail below with reference to FIG. 2.

The DLP agent 120 is configured to monitor data read from a network share 170 or other external shared storage device. The network share 170 is, in one embodiment, a shared data repository accessible over the network 103 by any number of client computing systems 102. The network share 170 may be attached to the server computing system 106, or alternatively, directly attached to the network 103. The DLP agent 120 is discussed in greater detail below with reference to FIGS. 2-3.

Figure 2:
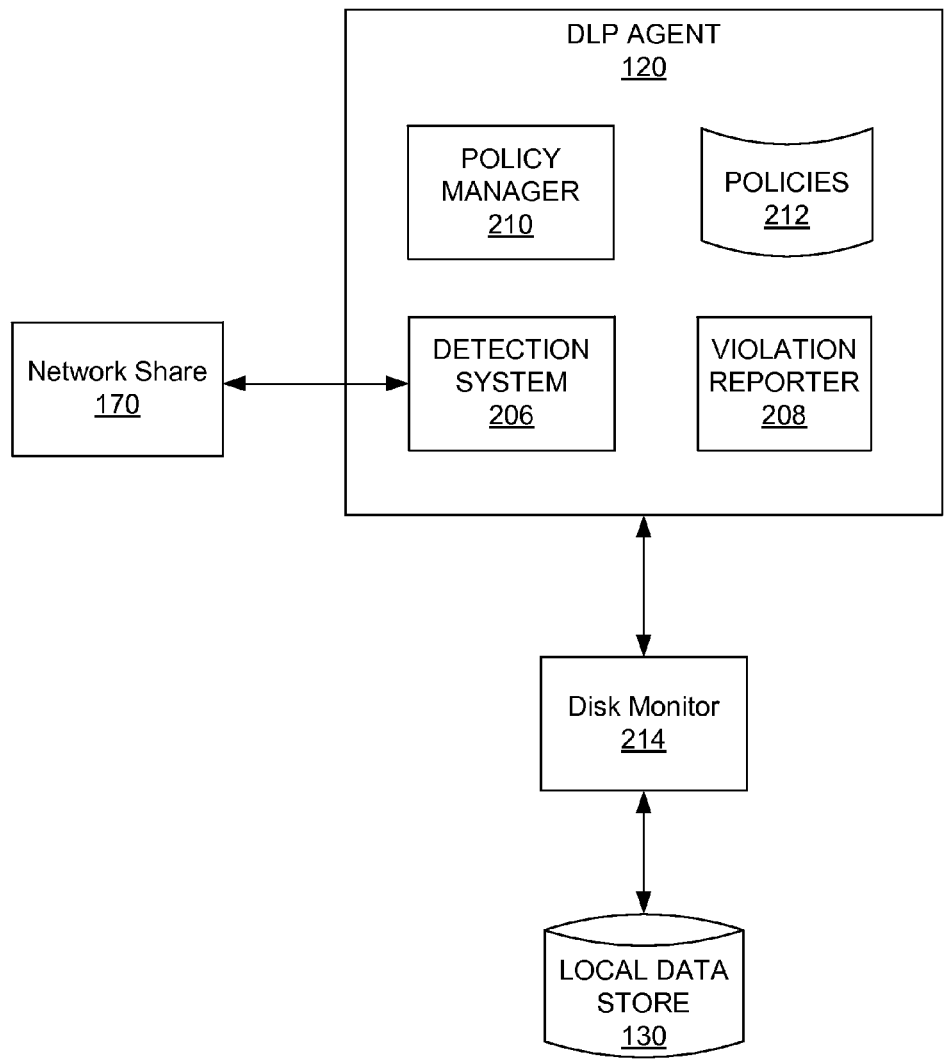
FIG. 2 illustrates one embodiment of the DLP agent in accordance with embodiments of the present invention.

FIG. 2 illustrates one embodiment of the DLP agent 120 in accordance with embodiments of the present invention. The DLP agent 120 also includes a violation reporter 208, a policy manager 210, and a policy data store 212. In the depicted embodiment, the detection system 206 is configured to monitor inbound data transfers from the network share 170. The inbound data transfers may include data in transit, such as data associated with a file being transferred from the network share 170.

The detection system 206 is configured to determine whether the data transfers violate a DLP policy. The detection system 206 may use any one or more of the methods to detect sensitive information including, but not limited to, as described above, such as 1) described content matching (e.g. regular expressions, keyword dictionaries); 2) fingerprinting; and 3) machine-learning based content classification. However, there may instances where the information to be protected is not known exactly, or cannot be described exactly using regular expressions and/or keyword dictionaries. For example, there may be instances where there is new information which is sensitive but is not known to the DLP agent 120 a-priori.

The detection system 206 is used to detect the DLP policies and may perform some remedial or notification operation to help enforce the DLP policies. In some embodiments, when the detection system 206 considers the data transfer as insecure (e.g., detects a violation of the DLP policy), the detection system 206 can pause the data transfer and alert a user or an administrator. For example, the detection system 206 can generate an alert for a user to approve or deny the data transfer. Similarly, the alert can be provided to an administrator to approve or deny the data transfer.

In one embodiment, when the detection system 206 detects the violation, the violation reporter 208 creates an incident record of the violation, and sends the incident record to a DLP system (or other DLP manager) and/or stores the incident record in the local data store 130. The violation reporter 208 can send the incident records as they are generated or periodically. Similarly, the violation reporter 208 can send multiple incident records to the DLP system 108 in batches or sequentially. If a violation is detected, the violation reporter 208 may notify a system administrator (e.g., send an email or update a log file) about the policy violation incident, and may send information about the policy violation incident to a DLP service provider or system. The information sent to the DLP service provider may identify, for example, the DLP policy being violated, the type of data being transferred, the destination entity specified to receive the data transfer, or other information concerning the violation, an identifier of the user or the client computing system 102 that caused the violation, as well as other information that may be helpful in remedying or recording the incidents.

The policy manager 210 defines DLP policies and stores them in the policy data store 212. The policy may also be used to monitor and detect for other types of DLP violations. For example, the policy may also specify sensitive data that should trigger a DLP policy if detected in the data transfer. The policy manager 210 may create DLP policies based on user input, such as from the user of the client computing system 102 or an administrator of an organization providing the client computing system 102. Alternatively, the policy manager 210 may receive DLP policies from a DLP service provider and store the DLP policies in the policy data store 212.

In one embodiment, the DLP agent 120 is further configured to detect when an application 140 (see FIG. 1) opens or requests to open a file from the network share 170. The DPL agent also is configured to notify a disk monitor 214 to enable disk monitoring of the local data store 130 for the identified application. The disk monitor 214 monitors the application for all file system events that might involve the data from the network share 170. File system events include, but are not limited to new file creations, writes of data to a local file (e.g., copying or pasting data from a remote file into a local file), and saving a file to a local data store 130.

When disk monitoring is enabled, the disk monitor 214, together with the detection system 206, identify DLP policy violations as described above. The disk monitor 214 detects the local file system event (e.g., opening, writing to, or closing a file stored on the local data store 130) and notifies the detection system 206. The detection system 206 analyzes data associated with the file system event and verifies that the movement of the data does not violate a DLP policy.

In one embodiment, the disk monitor 214 is configured to monitor write operations of the identified application. In other words, the disk monitor 214, to improve efficiency, monitors save and file close operations instead of constantly monitoring every operation requested by the application. The DLP agent 120 instructs the disk monitor 214 to cease disk monitoring of the application 140 when the application 140 closes the file on the network share 170, or when the application 140 terminates.

In some embodiments, the DLP agent 120 is configured to determine whether a file from the network share 170 should be analyzed based on certain criteria. The criteria include, but are not limited to, file type, files size, or file path. In some embodiments, the DLP agent 120 is configured to determine whether file on the local data store 130 should be analyzed based on certain criteria. For example, when the application 140 saves or closes a new file on the local data store 130, the DLP agent 120 decides whether to analyze the new file, with the detection system 206, to determine if the new file contains confidential information. This decision is based on heuristics that include, but are not limited to, whether the file being saved has the same file name, size, or extension as the network share file.

In a further embodiment, the DLP agent 120 is configured to compute and store a fingerprint or hash of the network share file if the file contains confidential information. Subsequently, the DLP agent 120 is configured to compare the fingerprint of the network share file with the fingerprint of any file created or modified by the application 140 to determine if the created or modified file contains confidential information that would violated the DLP policy.

In another embodiment, the DLP agent 120 is configured to respond to a policy violation when detected by the detection system 206. In one example, the DLP agent 120 instructs the violation reporter 208 to generate an incident report as described above. Additionally, the DLP agent 120 may encrypt the new or modified file stored on the local data store 130 so as to render the new or modified file unusable to the user. In another embodiment, the DLP agent 120 may quarantine or block access to the new or modified file containing confidential information.

Figure 3:
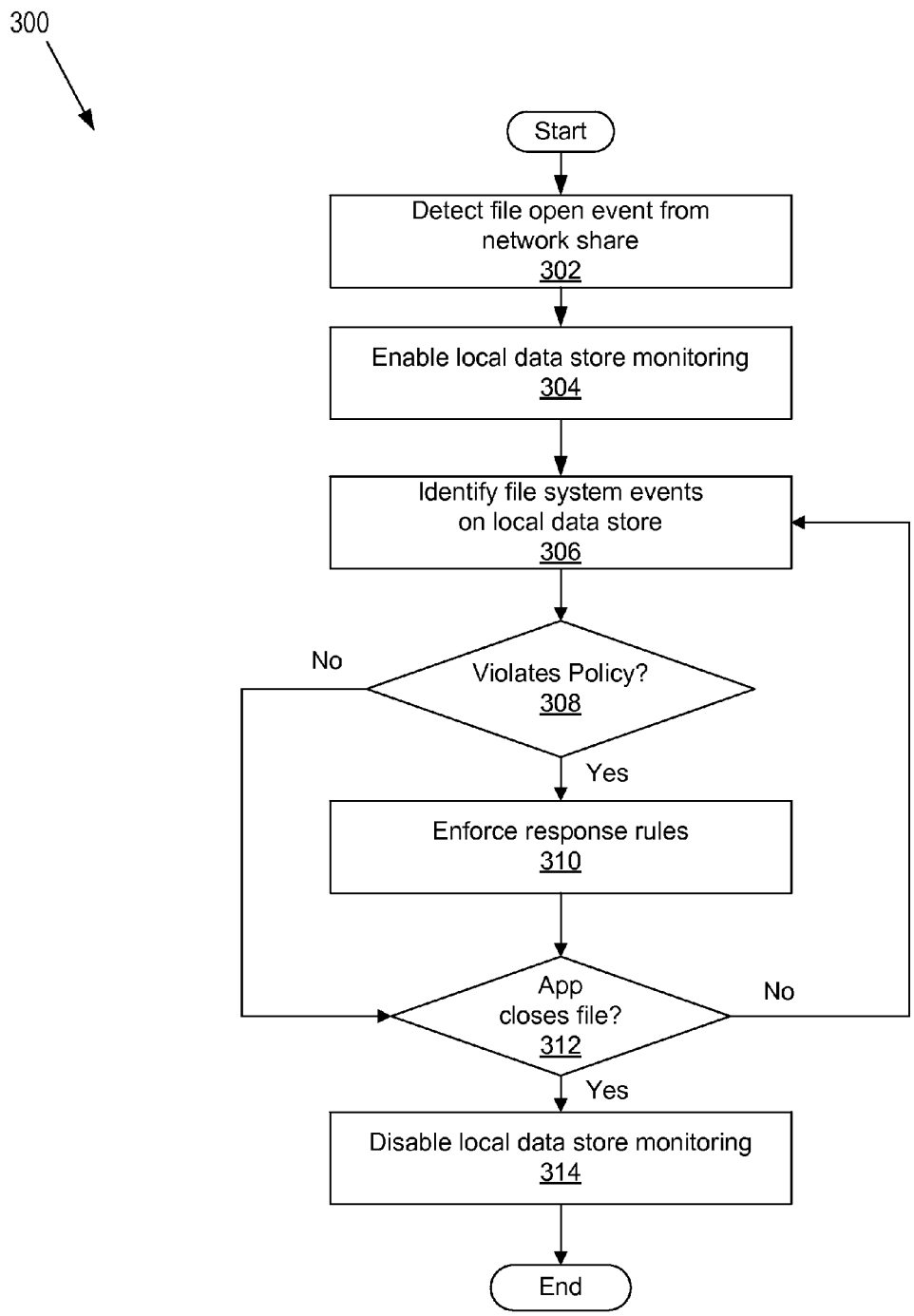
FIG. 3 illustrates a flow diagram of one embodiment of a method for monitoring and enforcing DLP policies of network shared files.
Figure 4:
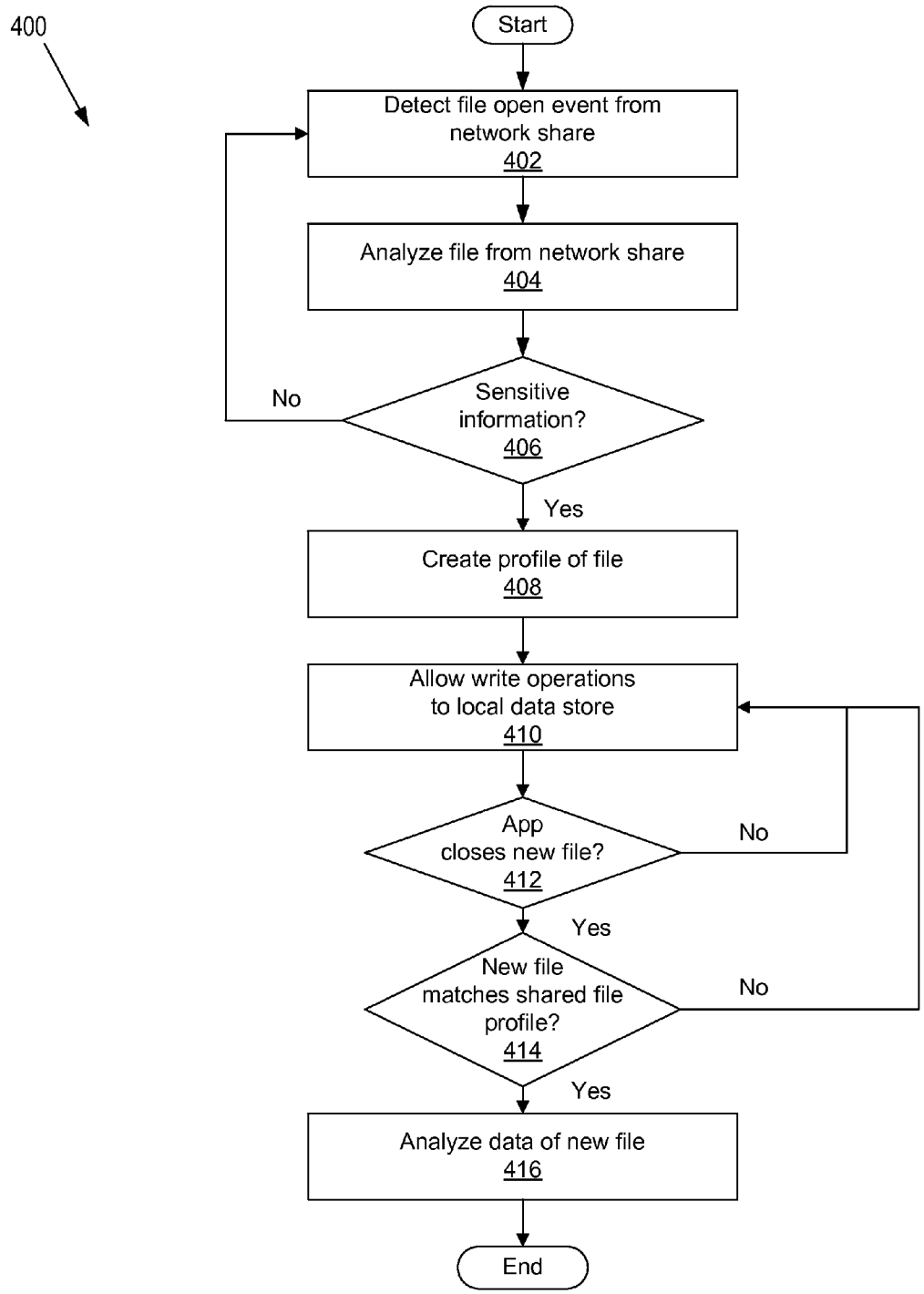
FIG. 4 illustrates one embodiment of a flow diagram for a method of pre-detecting confidential information in a network shared file.

FIGS. 3-4 are flowchart and/or block diagram illustrations of methods, systems, and computer program products according to an embodiment of the disclosure. It will be understood that each block of the flowchart and/or block diagram illustrations, and combinations of blocks in the flowchart and/or block diagram illustrations, may be implemented by processing logic. The processing logic may comprise hardware (circuitry, dedicated logic, etc.), software (such as is run on a general-purpose computer system or a dedicated machine), or a combination of both. These software instructions, or other computer program instructions, may be provided to a processor of a general purpose computer, special purpose computer, or other programmable data processing apparatus to produce the processing logic, such that the instructions, which execute via the processor of a computer or other programmable data processing apparatus, implement the functions of the DLP agent 120 specified in the flowchart and/or block diagram block or blocks.

FIG. 3 illustrates a flow diagram of one embodiment of a method 300 for monitoring and enforcing DLP policies of network shared files. In one embodiment, the method 300 starts and the processing logic, at block 302, detects a file open event from the network shared device 170. For example, the processing logic may identify that an application is attempting to access a file from a shared network folder. In a further example, if the client computing system 102 is a computer with a Windows® based operating system, the processing logic is configured to engage the LANMan Redirector, or any other network redirector which allows access to a remote files and directories, to identify when the application 140 is accessing a remote file. The LANMan Redirector, as one of skill in the art will recognize, is a client-side remote file system driver to allow applications 140 to access remote files and directories. The processing logic, as such, is configured to receive file open event notifications from the Redirector.

At block 304, the processing logic instructs the disk monitor 214 to enable or begin to monitor the local data store 130. The processing logic, at block 306, identifies file system events on the local data store 130 that correspond to the application 140. For example, each application 140 may be identified by an application ID or process number. The processing logic may be configured to monitor and identify file system events on the local data store that are associated with the application ID or process number.

At block 308, the processing logic determines if the newly created or modified file associated with the identified file system event violates a DLP policy. As described above with respect to FIG. 2, the processing logic detects sensitive information by any method available as one of skill in the art will recognize that includes, but is not limited to: 1) described content matching (e.g. regular expressions, keyword dictionaries); 2) fingerprinting; and 3) machine-learning based content classification. However, there may instances where the information to be protected is not known exactly, or cannot be described exactly using regular expressions and/or keyword dictionaries. One of skill in the art will recognize that multiple and varied methods exist for analyzing the content of a file that may be utilized in the present disclosure to identify confidential information.

If, at block 308, the processing logic determines that the newly created or modified file does in fact violate a DLP policy, the processing logic enforces response rules at block 310. The response rules specify what actions should be taken by the processing logic when a policy violation is detected. For example, a response rule may require that a message containing confidential data be blocked, re-routed, reported, quarantined, encrypted, etc.

If, at block 312, the processing logic determines that the application has closed the original file that originated from the network shared device 170, then the processing logic instructs the disk monitor 214 to disable monitoring of the local data store 130 with regard to the application 140 that had opened the original file. Alternatively, if the processing logic determines that the file has not been closed by the application 140, then the method 300 continues and the processing logic, at block 306, continues to identify file system events related to the application 140 in the local data store 130 until the application terminates.

FIG. 4 illustrates one embodiment of a flow diagram for a method of pre-detecting confidential information in a network shared file. The method 400 starts and the processing logic detects a file open event from a file located on a network shared device 170. In one embodiment, the processing logic is configured to identify any file system event of a file located on the network shared device by interfacing with a file system driver. In one example, the file system driver is the LANMan redirector (or any other network redirector which allows access to a remote files and directories). One of skill in the art will recognize that operating systems generally include one or more remote file system drivers, and the processing logic may be configured according to the operating system or file system driver of the client computing system 102.

At block 404, the processing logic analyzes the contents of the file received from the network shared device 170. If the processing logic determines, at block 406, that the network share file contains sensitive or confidential information, the processing logic creates a profile of the file at block 408. The processing logic may be configured to analyze the contents of the file by performing, for example, a keyword search or other method of analyzing data. The processing logic is configured to create a profile of the file by collecting metadata associated with the file. For example, the processing logic may identify metadata, which includes but is not limited to, filename, file size, file type, and fingerprint of the file. The processing logic stores the profile for later comparison to any file that the application may create or modify.

At block 410, the processing logic allows create, write, and read operations to the local data store. Beneficially, allowing write operations to the local data store, without analyzing or otherwise blocking the application from file system write events, significantly reduces processor utilization of the client computing system 102, and any application crashes that may occur while the application waits for the file system write event to occur. If, at block 412, the processing logic determines that the application has closed the network shared file (e.g., closed the network shared file), the processing logic is configured to identify the metadata of the new or modified file stored in the local data store. The processing logic, consequently, is configured to analyze metadata including, but not limited to, file size, file type, file name, fingerprint, etc., and compare the profile to the saved profile of the original, network shared file. If, at block 414, the processing logic determines that the metadata of the newly created or modified file matches the metadata of the original file, then the processing logic is configured to analyze the new file, at block 416.

Figure 5:
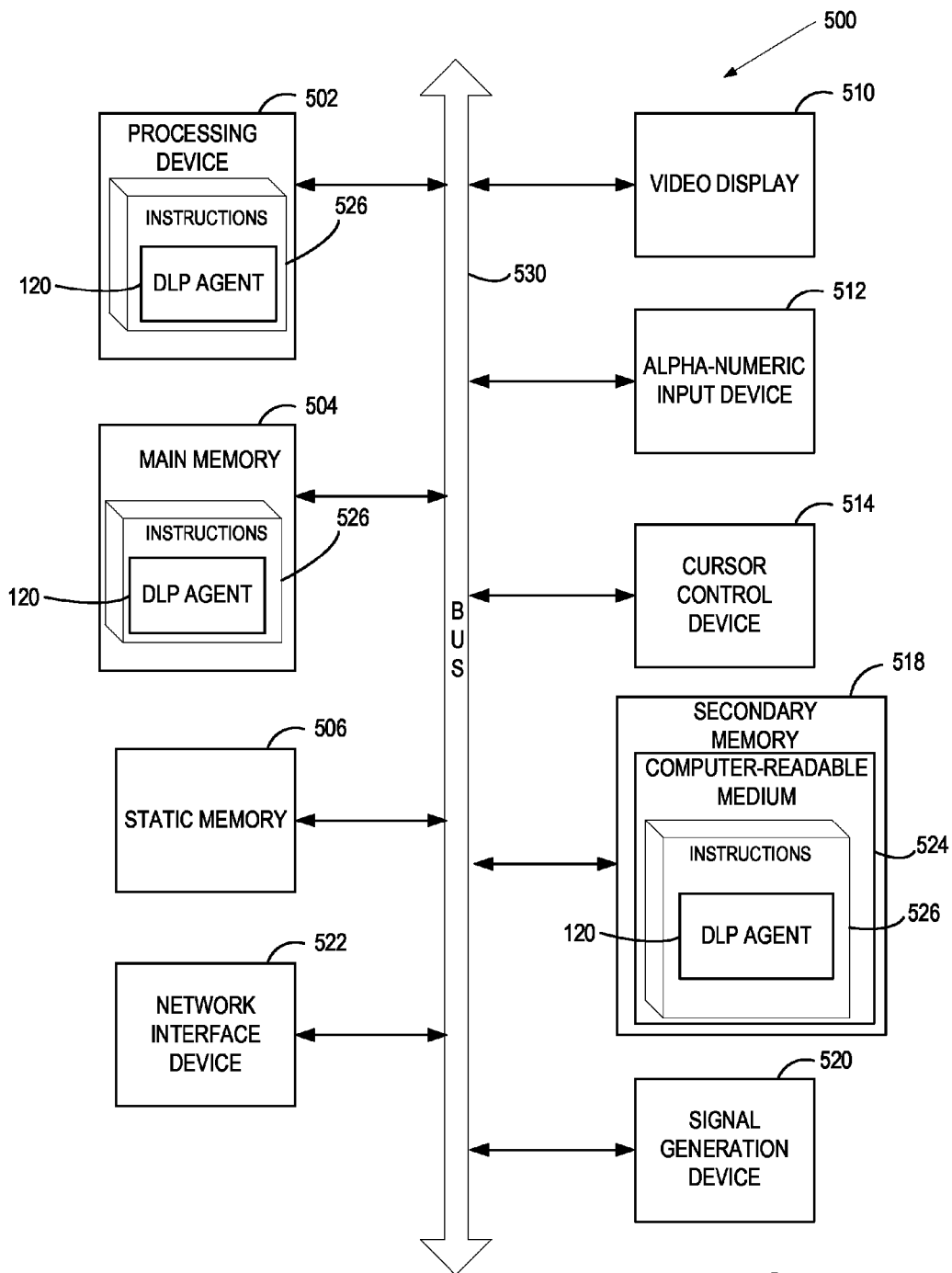
FIG. 5 is a diagram of one embodiment of a computer system for facilitating the execution of the DLP manager.

FIG. 5 is a diagram of one embodiment of a computer system for facilitating the execution of the DLP manager. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a secondary memory 518 (e.g., a data storage device in the form of a drive unit, which may include fixed or removable computer-readable storage medium), which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 518 may include a machine-readable storage medium (or more specifically a computer-readable storage medium) 524 on which is stored one or more sets of instructions 526 embodying any one or more of the methodologies or functions described herein. In one embodiment, the instructions 526 include instructions for the DLP manager 104. The instructions 526 may also reside, completely or at least partially, within the main memory 504 and/or within the processing device 502 during execution thereof by the computer system 500, the main memory 504 and the processing device 502 also constituting machine-readable storage media.

The computer-readable storage medium 524 may also be used to store the instructions 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 526, components and other features described herein can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing," "generating," "installing," "monitoring," "enforcing," "receiving," "logging," "intercepting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

We claim:

1. A method comprising:
    identifying, by a processor, a request by an application to access a file from a shared storage device over a network;
    enabling monitoring on a local data store to detect file system requests by the application in response to the identifying;
    creating a first profile of the file from the shared storage device, wherein the profile comprises metadata associated with the file;
    analyzing data associated with the file to determine if the data violates a data loss prevention (DLP) policy, wherein the analyzing the data comprises:
        detecting write operations to a new file stored to the local data store by the application;
        creating a second profile, the second profile associated with the new file, wherein the second profile associated with the new file comprises metadata associated with the new file; and
        comparing the first profile to the second profile; and
    enforcing a response rule associated with the file if the data associated with the file violates the DLP policy, wherein the enforcing comprising enforcing the response rule against the new file when the second profile matches the first profile and not enforcing the response rule against the new file when the second profile does not match the first profile.

2. The method of claim 1, further comprising:
    detecting that the application has closed the file; and
    disabling monitoring on the local data store for the application.

3. The method of claim 1, wherein the metadata of the file comprises at least one of filename, file size, file type, or fingerprint, and wherein the metadata of the new file comprises at least one of filename, file size, file type, or fingerprint, wherein the second profile matches the first profile when any one of the metadata of the file matches any one of the metadata of the new file.

4. The method of claim 1, wherein the write operations comprise one of a file save event, a file save-as event, a file close event, or a copy event.

5. The method of claim 1, wherein the enforcing further comprises one of blocking confidential data, re-routing confidential data, reporting the violation, quarantining the data, or encrypting the data.

6. A non-transitory computer readable storage medium including instructions that, when executed by a processing device, cause the processing device to perform operations comprising:
    identifying a request by an application to access a file from a shared storage device over a network;
    enabling monitoring on a local data store to detect file system requests by the application in response to the identifying;
    creating a first profile of the file from the shared storage device, wherein the profile comprises metadata associated with the file;
    analyzing data associated with the file to determine if the data violates a data loss prevention (DLP) policy, wherein the analyzing the data comprises:
        detecting write operations to a new file stored to the local data store by the application;
        creating a second profile, the second profile associated with the new file, wherein the second profile associated with the new file comprises metadata associated with the new file; and
        comparing the first profile to the second profile; and
    enforcing a response rule associated with the file if the data associated with the file violates the DLP policy, wherein the enforcing comprising enforcing the response rule against the new file when the second profile matches the first profile and not enforcing the response rule against the new file when the second profile does not match the first profile.

7. The non-transitory computer readable storage medium of claim 6, wherein the the operations further comprise:
    detecting that the application has closed the file; and
    disabling monitoring on the local data store for the application.

8. The non-transitory computer readable storage medium of claim 6, wherein the metadata of the file comprises at least one of filename, file size, file type, or fingerprint, and wherein the metadata of the new file comprises at least one of filename, file size, file type, or fingerprint, wherein the second profile matches the first profile when any one of the metadata of the file matches any one of the metadata of the new file.

9. The non-transitory computer readable storage medium of claim 6, wherein the write operations comprise one of a file save event, a file save-as event, a file close event, or a copy event.

10. The non-transitory computer readable storage medium of claim 6, wherein the enforcing further comprises one of blocking confidential data, re-routing confidential data, reporting the violation, quarantining the data, or encrypting the data.

11. A computing apparatus comprising:
    a memory; and
    a processor coupled with the memory to execute a data loss prevention (DLP) agent to:
        identify a request by an application to access a file from a shared storage device over a network;

enable monitoring on a local data store to detect file system requests by the application in response to the identified request;

create a first profile of the file from the shared storage device, wherein the profile comprises metadata associated with the file;

analyze data associated with the file to determine if the data violates a data loss prevention (DLP) policy, wherein the DLP agent is further to:

detect write operations to a new file stored to the local data store by the application;

create a second profile, the second profile associated with the new file, wherein the second profile associated with the new file comprises metadata associated with the new file; and compare the first profile to the second profile; and enforce a response rule associated with the file if the data associated with the file violates the DLP policy, wherein the response rule is enforced against the new file when the second profile matches the first profile and is not enforced against the new file when the second profile does not match the first profile.

12. The computing apparatus of claim 11, wherein the DLP agent is further to:

detect that the application has closed the file; and disable monitoring on the local data store for the application.

13. The computing apparatus of claim 11, wherein the write operations comprise one of a file save event, a save-as event, a file close event, or a copy event.

14. The computing apparatus of claim 11, wherein the DLP agent is further to one of block confidential data, re-route confidential data, report the violation, quarantine the data, or encrypt the data.

* * * * *

UNITED STATES PATENT AND TRADEMARK OFFICE
CERTIFICATE OF CORRECTION

PATENT NO. : 8,832,780 B1
APPLICATION NO. : 13/533114
DATED : September 9, 2014
INVENTOR(S) : Sumit Sarin and Amit Shinde Page 1 of 1

It is certified that error appears in the above-identified patent and that said Letters Patent is hereby corrected as shown below:

In the Claims,

In claim 7, column 12, line 42, delete "the"

Signed and Sealed this
Third Day of March, 2015

Michelle K. Lee
*Deputy Director of the United States Patent and Trademark Office*